(12) United States Patent
Lin

(10) Patent No.: US 6,254,271 B1
(45) Date of Patent: Jul. 3, 2001

(54) PROBE COVER OF TYMPANIC THERMOMETER

(75) Inventor: Kevin Lin, Hsinchu (TW)

(73) Assignee: Oriental System Technology Inc. (TW)

( * ) Notice: Subject to any disclaimer, the term of this patent is extended or adjusted under 35 U.S.C. 154(b) by 0 days.

(21) Appl. No.: 09/342,627

(22) Filed: Jun. 29, 1999

(51) Int. Cl.$^7$ ................................. G02K 5/22; A61B 6/00
(52) U.S. Cl. .................. 374/158; 128/9; 600/186; 600/200; 600/203; 600/184; 600/549; 600/474
(58) Field of Search ................. 374/158; 128/9; 600/186, 200, 203, 184, 474, 549, 438, 555

(56) References Cited

U.S. PATENT DOCUMENTS

| | | | |
|---|---|---|---|
| Re. 34,599 | * 5/1994 | Suszynski et al. | 374/158 |
| 4,662,360 | * 5/1987 | O'Hara et al. | 128/9 |
| 4,911,559 | * 3/1990 | Meyst et al. | 374/158 |
| 5,088,834 | 2/1992 | Howe et al. | 374/158 |
| 5,163,418 | 11/1992 | Fraden et al. | 128/9 |
| 5,795,067 | * 8/1998 | Fraden et al. | 374/158 |
| 5,833,367 | * 11/1998 | Cheslock et al. | 374/158 |
| 5,906,437 | * 5/1999 | Lin | 374/158 |
| 6,123,454 | * 9/2000 | Canfield et al. | 374/158 |
| 6,139,182 | * 10/2000 | Levatter et al. | 374/158 |
| 6,152,596 | * 9/2000 | Fraden | 374/158 |

\* cited by examiner

*Primary Examiner*—G. Bradley Bennett
*Assistant Examiner*—Gail Verbitsky

(57) ABSTRACT

A probe cover of a tympanic thermometer having a probe comprises a base in the form of a ring-type plastic sheet formed with a central opening; and a film sheath that is infrared transparent and has an open end and a closed end, wherein the open end is attached to the base, the sheath portion extended from the central opening can be fitted on the probe of tympanic thermometer, the film sheath comprises a first wall section, a second wall section, and a window between the open end and the closed end, wherein the entire first wall section is formed of a plurality of pleat surfaces and the width of each pleat surface is gradually reduced in the direction from the open end to the closed end, the second wall section is formed by plastic deformation and thus has a smooth wall surface, and the window is in the form of a flat closed surface for fitting on the front end of the probe.

2 Claims, 9 Drawing Sheets

PROBE COVER OF TYMPANIC THERMOMETER

FIELD OF THE INVENTION

The present invention relates generally to a tympanic thermometer, and more particularly, to a probe cover of a tympanic thermometer.

BACKGROUND OF THE INVENTION

Clinical thermometers are very helpful in the diagnosis of diseases. The tympanic membrane is generally considered by the medical community to be superior to oral, rectal, or underarm sites for representing the body's core temperature. The temperature of the tympanic membrane can be measured by detecting the infrared radiation from the tympanic membrane in the ear canal. In addition, the time needed for the body temperature measuring by using an infrared thermometer is short. The use of infrared thermometers therefore has become more and more prevalent.

To measure the infrared emission in the external ear canal, the probe of a tympanic thermometer has to be inserted into the external ear canal for sensing the infrared emission from the tympanic membrane to determine the temperature of the tympanic membrane. However, a tympanic thermometer that is used to determine the body temperature of different patients can cause contamination and infections. To prevent this disadvantage, the probe of a tympanic thermometer can be provided with a probe cover that is disposable after use.

Referring to FIG. 1, a probe cover of a tympanic thermometer disclosed in U.S. Pat. No. 5,163,418 to Fraden et al. comprises a sheath 31 and ring-shaped base 32. The sheath 31 is formed from a infrared transparent film having a thickness of 0.001 inch. The closed end of the sheath 31 is flat and acts as a window 311 for infrared emission. The circumferential wall 312 includes a plurality of pleats. The circumferential peripheral flange is attached to the ring-typed base 32. The base 32 is designed to fit tightly on the probe of the thermometer. When the base 32 is fitted on the probe of the thermometer, the window 311 contacts with the front inlet of the probe. The drawback of the probe cover lies in that when it is inserted in the ear canal, the pleats on the wall 312 of the sheath 31 scrape the skin of the canal and cause a patient feel uncomfortable. In addition, the sheath generates noises when it is pressed. Moreover, wrinkles appear on the window 31 when the probe cover is fitted on the probe and cause stray radiation that adversely affects the accuracy of the measured temperature.

Referring to FIG. 2, a probe cover of a tympanic thermometer disclosed in U.S. Pat. No. 5,088,834 to Howe et al. comprises a frustum-shaped sheath 41 and a base 42 formed from a single piece of infrared transparent material. The dimensions of the sheath 41 are chosen to let it fit on the probe closely. The thickness of the sheath 41 is gradually reduced from the proximal portion to the distal portion such that the window 411 has the minimal thickness of between approximately one thousandth and five then thousandths of an inch. The base 42 circumferentially engages with the open end (proximal end) of the sheath 41 for securing the sheath 41 on the probe of the thermometer. This type of sheath has no pleats and is comfortable for use. However, its disadvantage lies in that the sheath is formed by plastically deforming the material from its proximal open end to its distal closed end. The material is plastically deformed in a significant length so that the maximum thickness change of the material is from 0.03 in. to 0.0005 in. and this causes difficulty in quality control during the manufacturing process.

SUMMARY OF THE INVENTION

The primary object of the invention is to provide a probe cover of a tympanic thermometer, which achieves an easy manufacturing process and provides comfortable feeling in use.

To achieve the above object, a probe cover of a tympanic thermometer in accordance with the invention comprises a base in the form of a ring-type plastic sheet formed with a central opening; and a film sheath that is infrared transparent and has an open end and a closed end, wherein the open end is attached to the base, the sheath portion extended from the central opening can be fitted on the probe of the tympanic thermometer, the film sheath comprises a first wall section, a second wall section, and a window between the open end and the closed end, wherein the entire first wall section is formed of a plurality of pleat surfaces and the width of each pleat surface is gradually reduced in the direction from the open end to the closed end, the second wall section is formed by plastic deformation and thus has a smooth wall surface, and the window is in the form of a flat closed surface for fitting on the front end of the probe.

BRIEF DESCRIPTION OF THE DRAWINGS

The above and other objects and the features and effects of the present invention can be best understood by referring to the following detailed description of the preferred embodiment and the accompanying drawings, wherein.

DETAILED DESCRIPTION OF THE PREFERRED EMBODIMENTS

Figure 2:
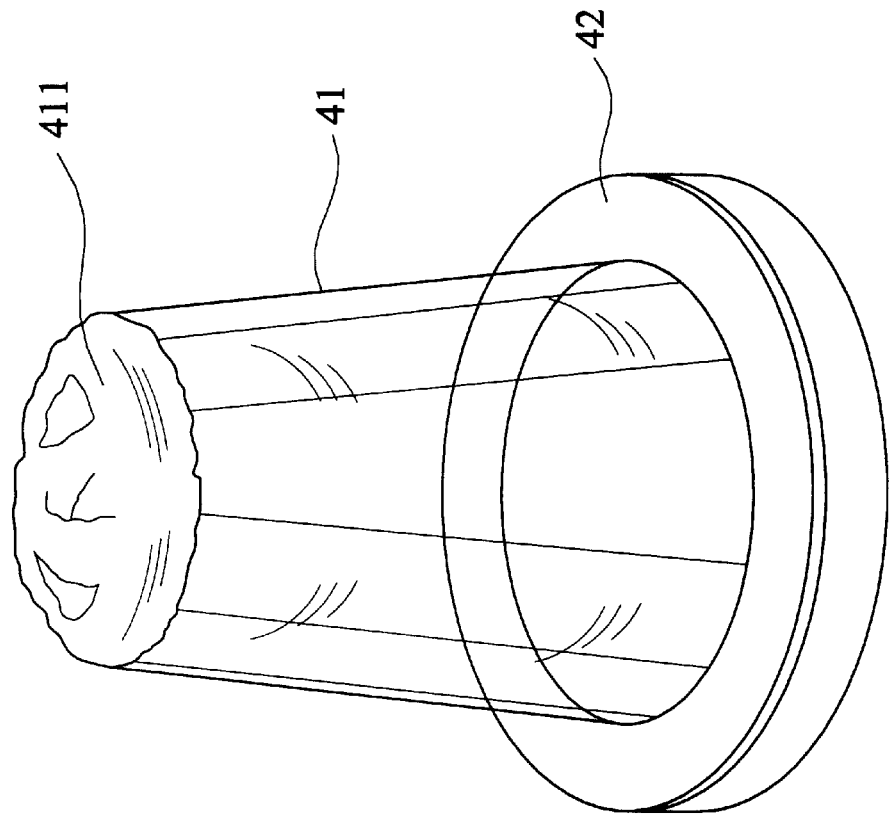
FIG. 2 is a pictorial view showing a probe cover for an infrared thermometer disclosed in U.S. Pat. No. 5,088,834.
Figure 1:
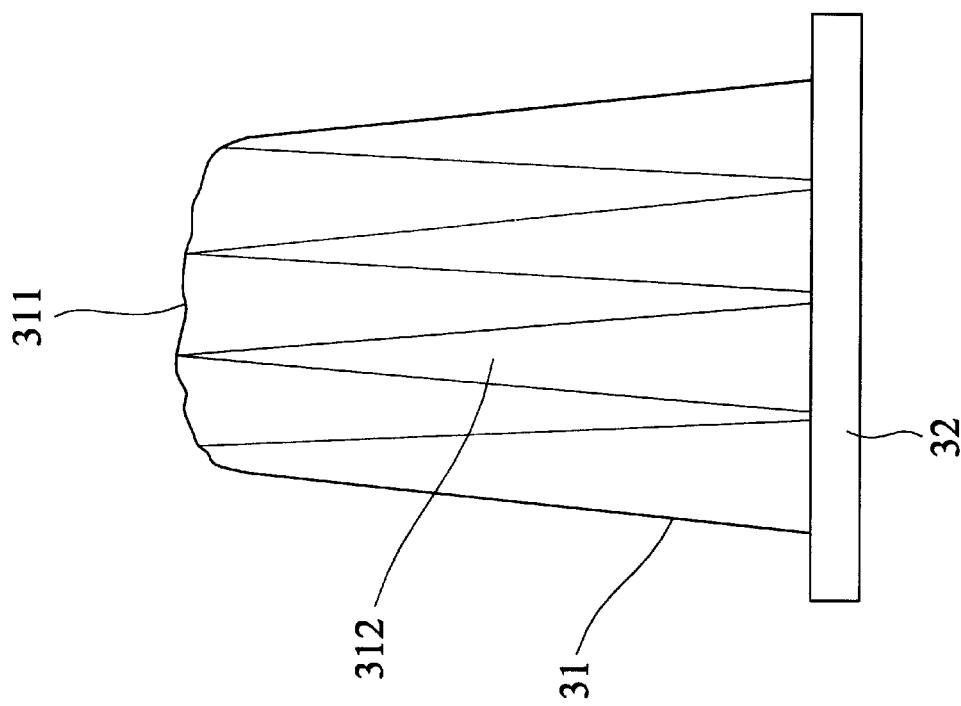
FIG. 1 is an elevational view showing a probe cover for an infrared thermometer disclosed in U.S. Pat. No. 5,163,418.
Figure 3:
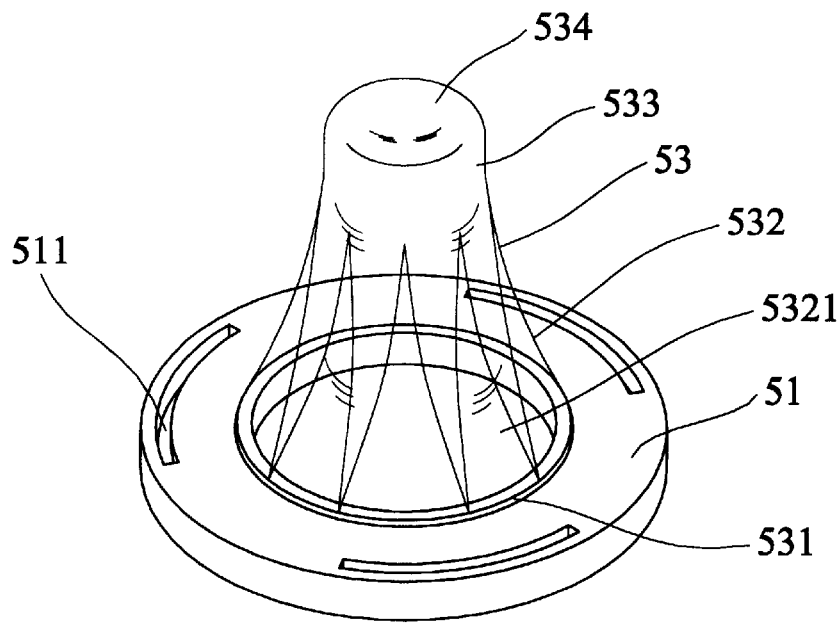
FIG. 3 is a pictorial view showing a probe cover, in its extended state, in accordance with the preferred embodiment of the invention.
Figure 4:
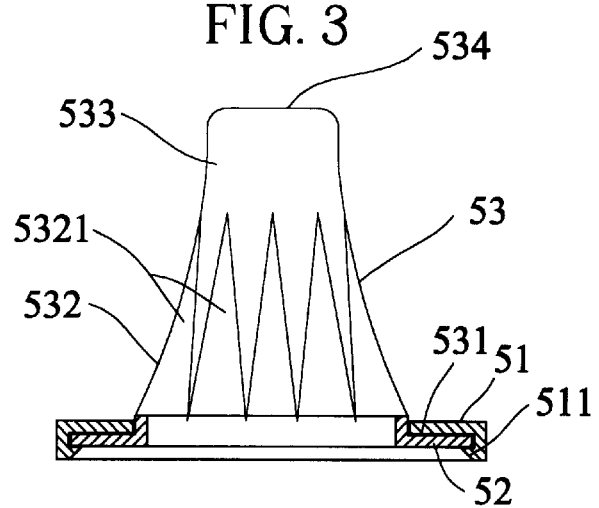
FIG. 4 is an elevational view showing a probe cover, in its extended state, in accordance with the preferred embodiment of the invention.

Referring to FIGS. 3 and 4, a probe cover in accordance with the preferred embodiment of the invention includes a base and a film sheath 53, wherein the base includes a first snap element 51 in the form of a ring-type plastic sheet symmetrically provided with three snap engaging portions 511 at the locations near its circumference and a second snap element 52 in the form of a ring-type plastic sheet that can be nestedly engaged with the first snap element 51. The circumferential edge of the second snap element 52 is secured by the snap engaging portions 511 of the first snap element 51.

Figure 5:
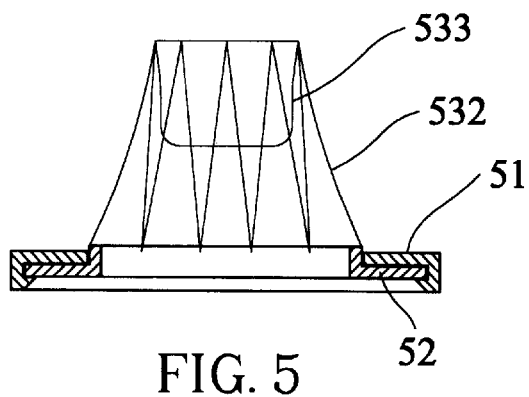
FIG. 5 is an elevational view showing a probe cover, in its collapsed state, in accordance with the preferred embodiment of the invention.

The film sheath 53 is infrared transparent and made of polyethylene or polypropylene. The film at the open end 531 is sandwiched and secured between the first snap element 51 and the second snap element 52. The sheath extends from the central opening of the first snap element 51 and the second element 52 can be fitted on the probe of a tympanic thermometer. The first wall section 532, the second wall section 533, and a window 534 are provided between the open end 531 and the closed end. The first wall section 532 is provided with a plurality of pleat surfaces 5321 and the width of each pleat surface is gradually reduced from its lower part to upper part. The second wall section 533 is formed by plastic deformation and thus has a smooth wall surface. The second wall section 533 is dimensioned to fit on the fore part of the probe and the thickness of the second wall section 533 is smaller than that of the first wall section 532. The window 534 is at the closed end of the sheath 53 and is formed as a flat closed surface for fitting on the front end of the probe. Since the second wall section 533 is formed by extending the film material, it is thin and flexible. Therefore, it collapses and is surrounded by the first wall section 532, as shown in FIG. 5.

Figure 6:
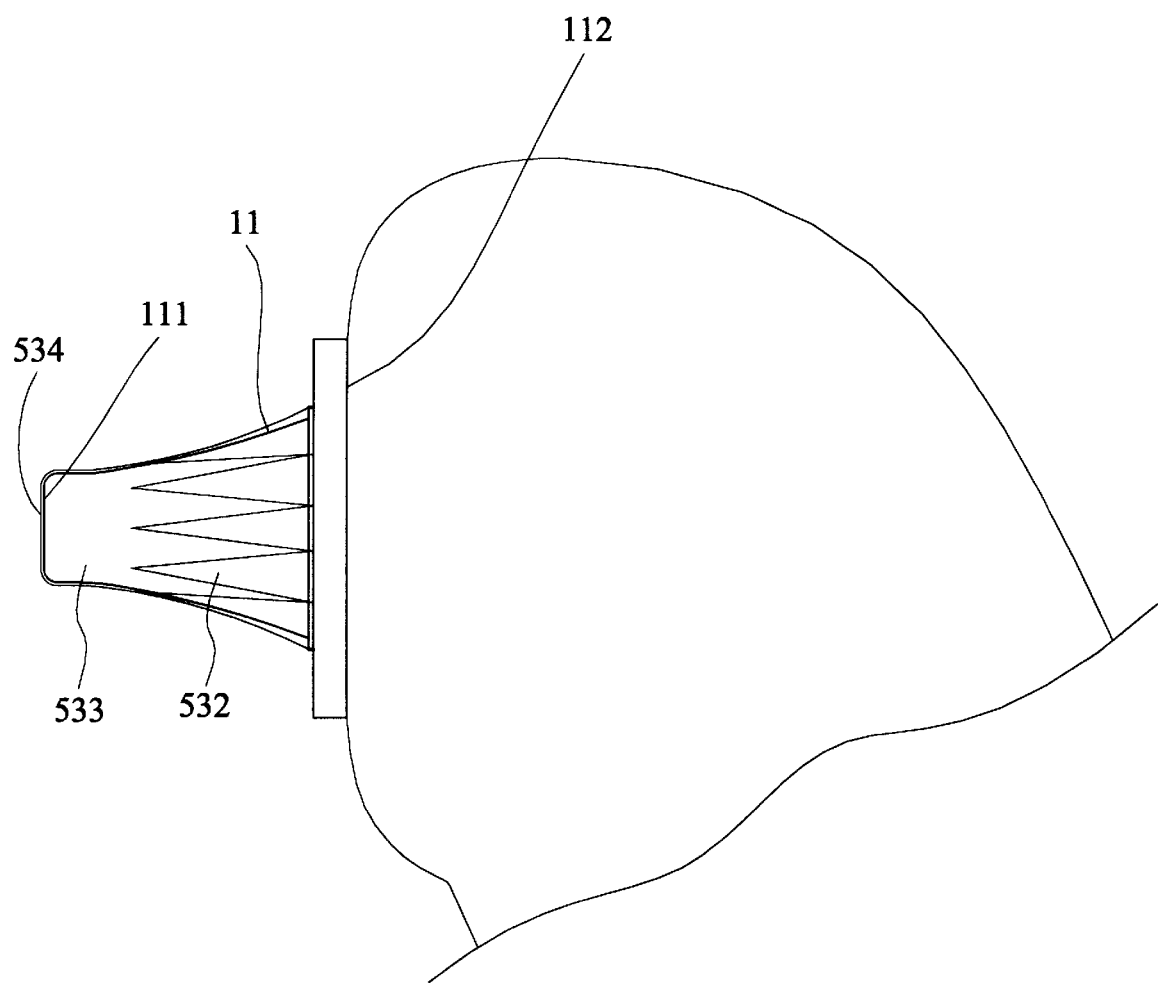
FIG. 6 is a schematic view illustrating the use of a probe cover in accordance with the preferred embodiment of the invention.

Referring to FIG. 6, when the probe cover in accordance with the invention is fitted on the probe 11, the central openings of the first and second snap elements are tightly engaged with the rear end 112 of the probe 11. The window 534 is fitted on the inlet 111 of the probe and the second wall section 533 is located over the fore section of the probe. When the probe is inserted in the external ear canal to measure the ear temperature, only the fore section of the probe is inserted in the external ear canal and the probe does not cause any discomfort and does not scrape the skin of the canal because the fore section of the probe is covered with the second wall section 533 having a smooth surface and having no any pleats. Moreover, the first wall section 532 a long two thirds of the length of the sheath 53 is naturally formed to provide pleats and the second wall section 533 in one third of the length of the sheath 53 is formed through plastic deformation by pressing the material. The extension length of the film material is significantly reduced and therefore the quality control in the manufacturing process can be done more easily.

Figure 7:
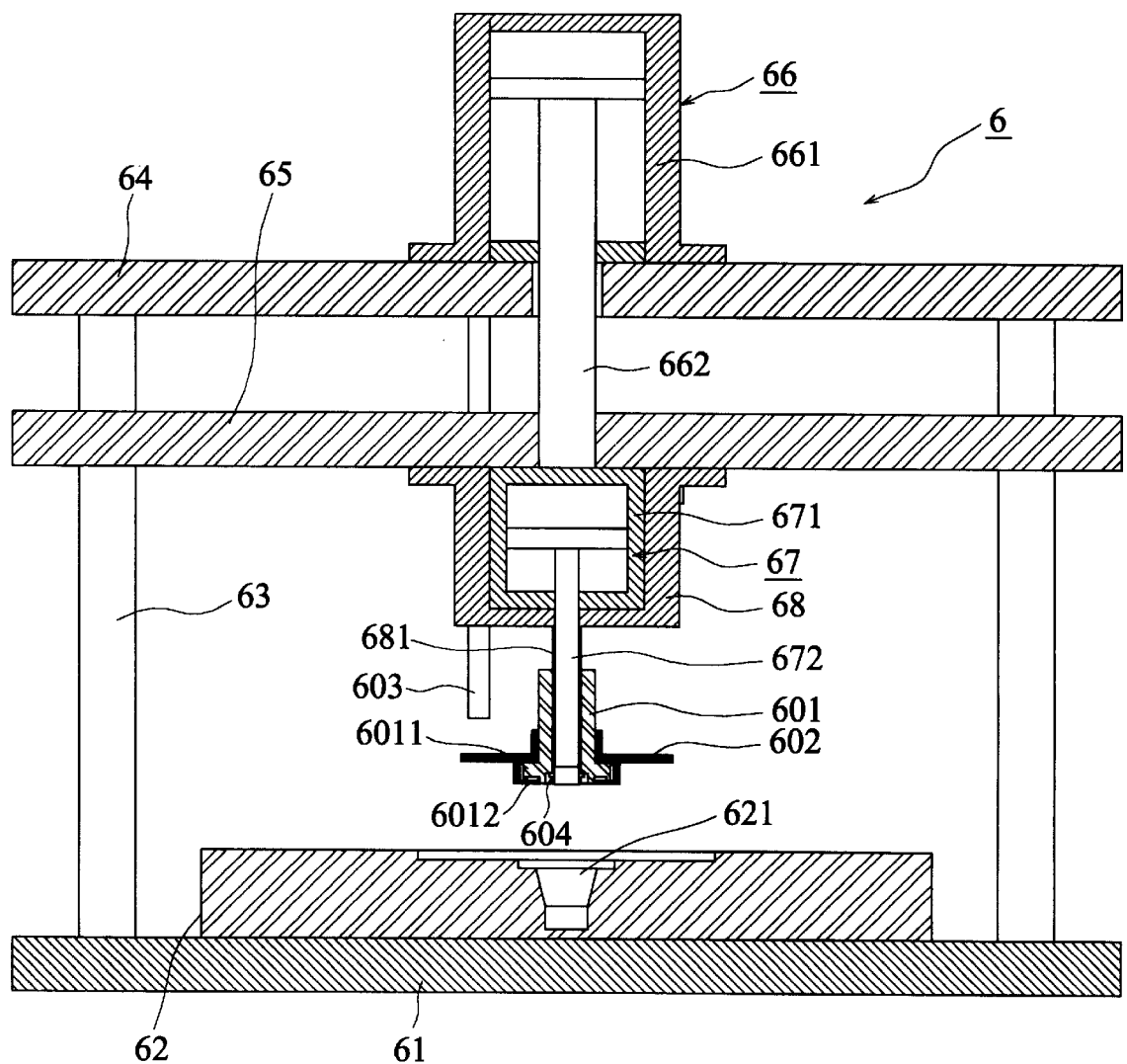
FIG. 7 is a sectional view showing a punch apparatus for use in accordance with the method of the invention.

Referring to FIG. 7, a punch apparatus 6 for manufacturing the probe cover in accordance with the preferred embodiment of the invention comprises a base 61, a mold plate 62, four supporting columns 63 (only two of them are visible in FIG. 7), a stationary plate 64, a movable plate 65, a first cylinder assembly 66, a second cylinder 67, a fixing cover 68, a securing element 601, an ejection element 602, and an ejection rod 603. The base 61 is in the form of the flat plate. The mold plate 62 is fixed on the base 61 and is formed with a mold cavity 621. The supporting columns 63 are provided at the four corners of the base 61. The stationary plate 64 is fixed on the upper ends of the four supporting columns. The movable plate 65 is formed with through holes for passing the supporting columns so that the movable plate can be moved up and down.

The first cylinder assembly 66 is mounted on the stationary plate 62. The first cylinder assembly 66 comprises a first cylinder 661 and a first punch rod 662 which passes through the stationary 64. The outer end of the first punch rod is securely connected with the movable plate 65.

The fixing cover 68 is fixed on the lower surface of the movable plate 65 so that the second cylinder assembly 67 is fixed on the lower surface of the movable plate 65. The lower end of the fixing cover 68 is integrally formed with a punch head 681 in the form of a hollow cylinder. The second cylinder assembly 67 comprises a second cylinder 671 and a second punch rod 672 which can be extended out from within the hollow portion of the punch head 681.

The securing element 601 is telescopically engaged with the outer surface of the punch head 681 and is fixed in position by a retention ring 604. At the lower end of the securing element 601 is formed a supporting flange 6011 and an engaging portion 6012 for tightly engaging with the second snap element 52

The ejection element 602 is telescopically engaged with the outer surface of the securing element 601 and is supported by the supporting flange 6011.

The ejection rod 603 is provided at the lower surface of the stationary plate 64 and can collide with the ejection element 602.

Figure 8:
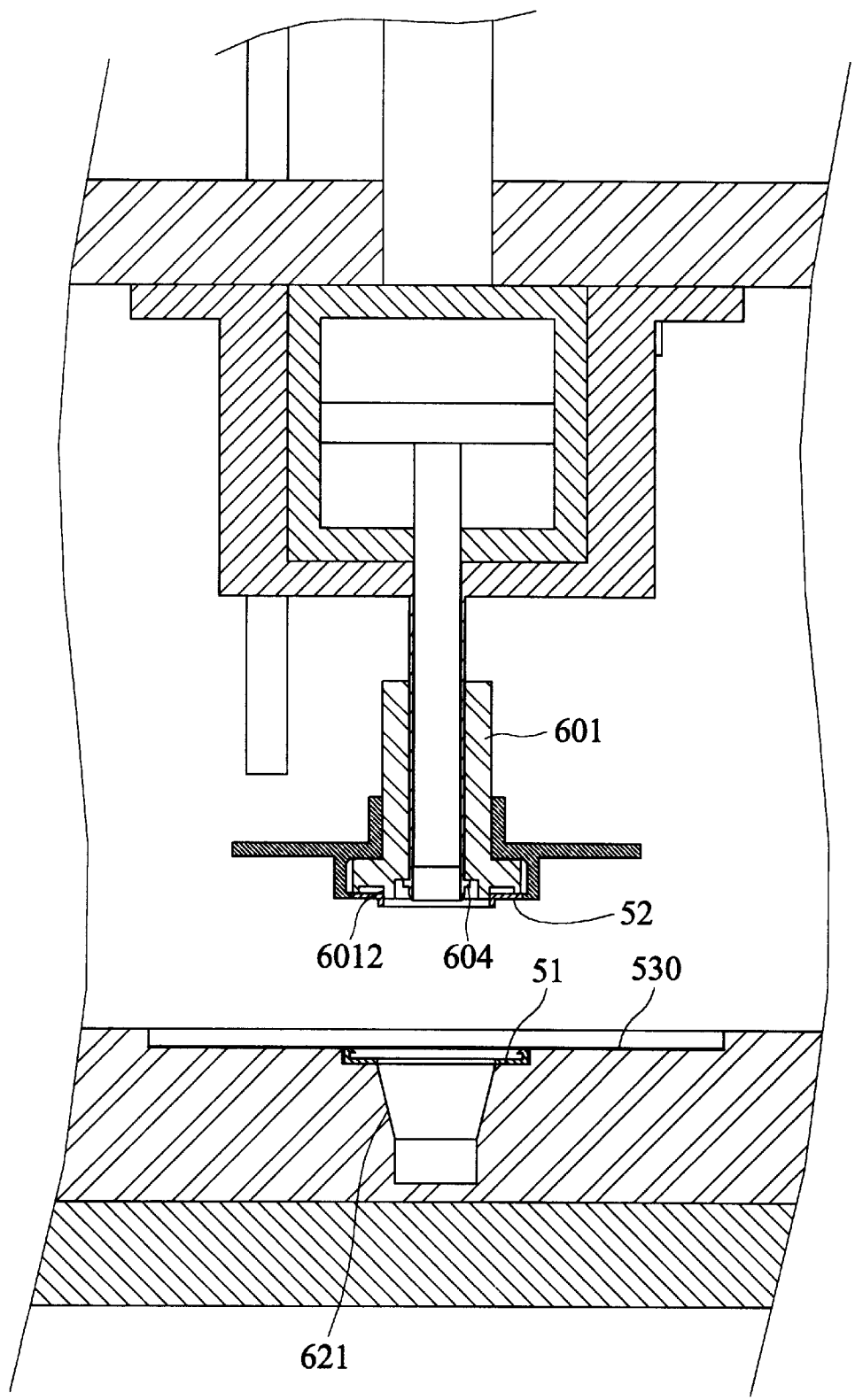
FIGS. 8 to 12 are sectional views showing the different stages in accordance with the method of the invention.
Figure 9:
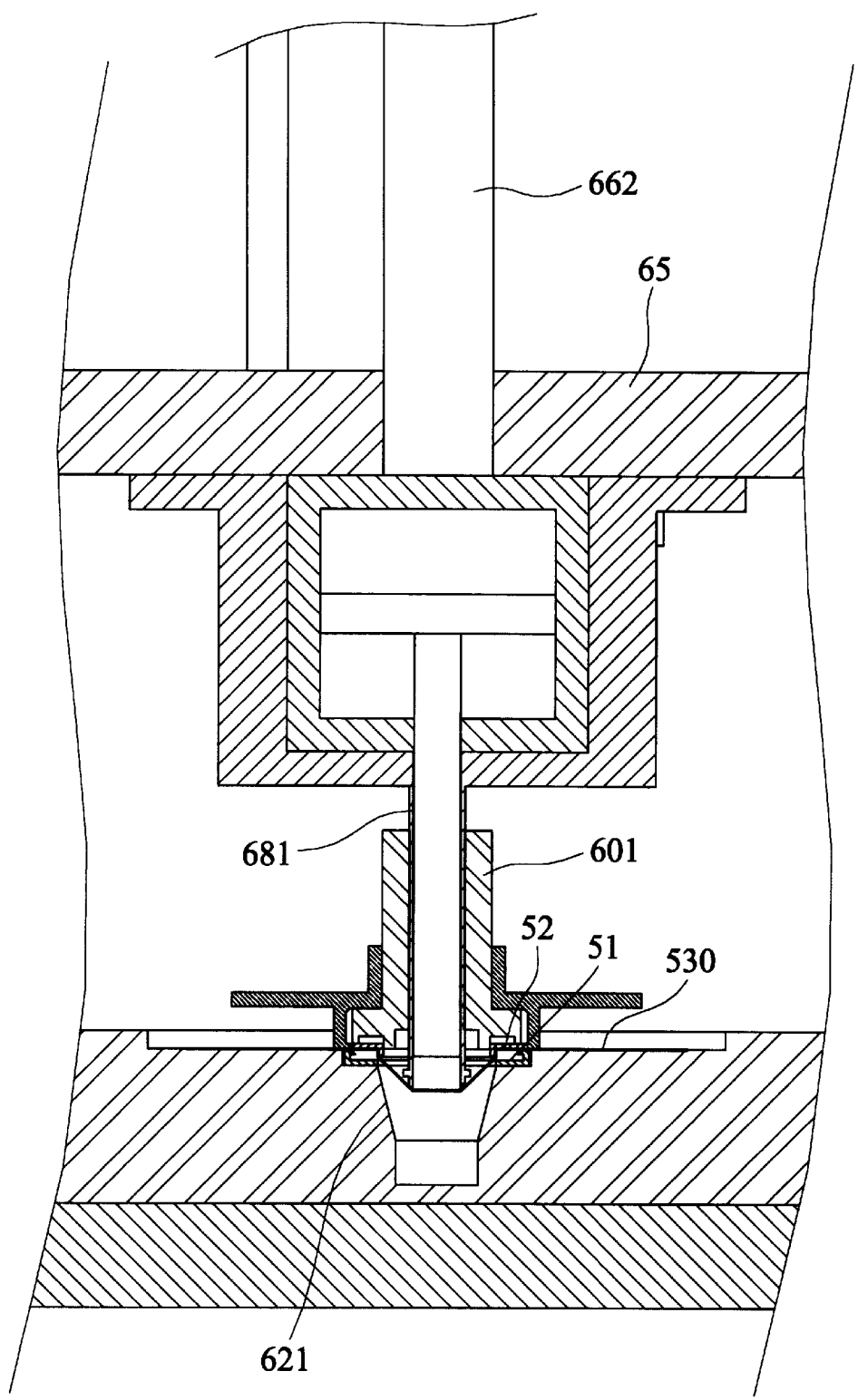
Figure 10:
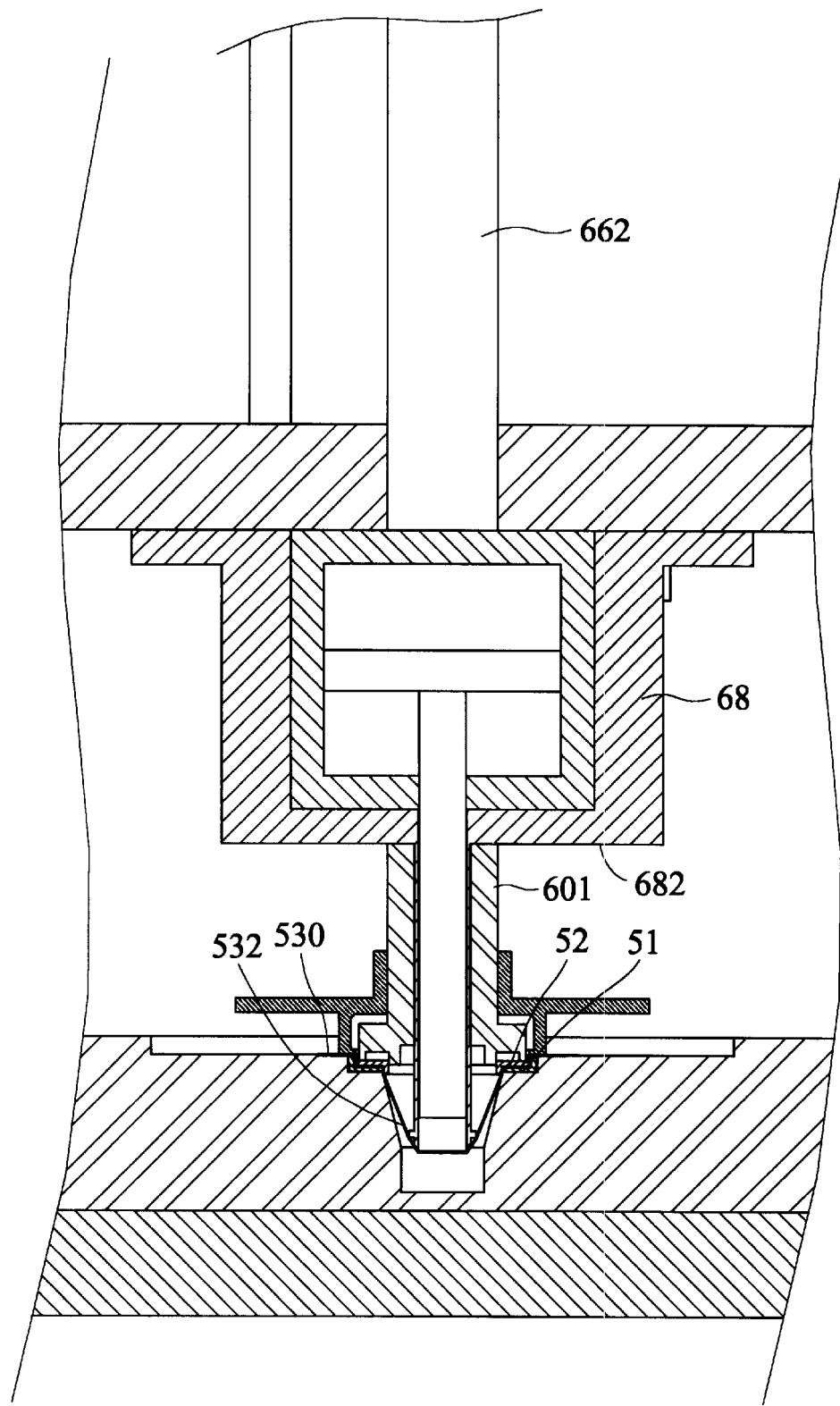
Figure 11:
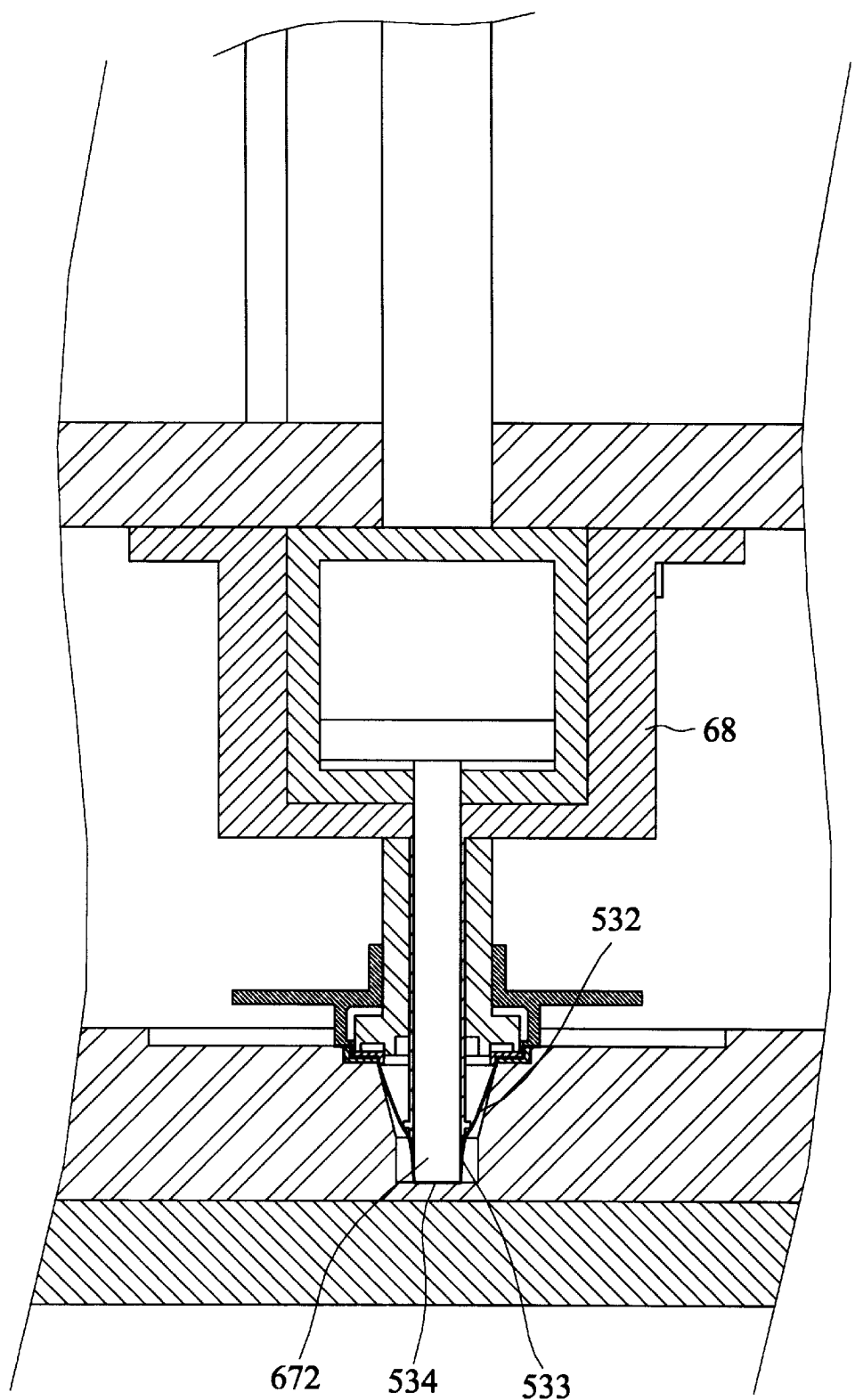
Figure 12:
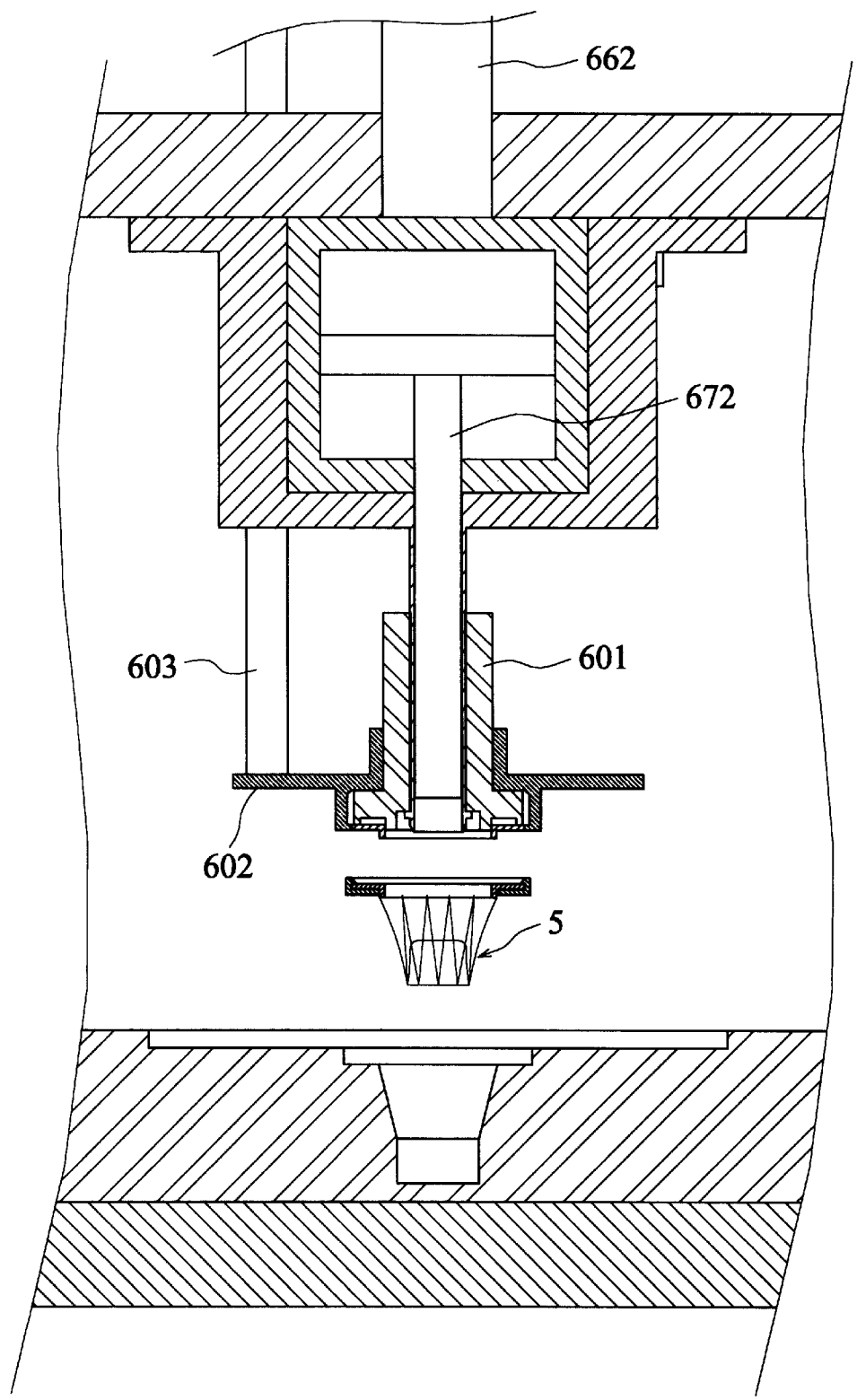

The process for manufacturing a probe cover in accordance with the preferred embodiment of the invention comprises the following steps:

a.) Injection molding a first snap element 51 in the form of a ring-typed sheet and formed with three snap engaging portions 511 at the circumference thereof;

b.) Injection molding a second snap element in the form of a ring-typed sheet for nestedly engaging with the first snap element 51 so that the circumference thereof is fixed in position by engaging with the snap engaging portions 511 of the first snap element 51;

c.) Cutting out a circular infrared transparent film 530;

d.) Placing the first snap element 51 in the mold cavity 621 and placing the film 530 on the first snap element 51 (referring to FIG. 8);

e.) Placing the second snap element 52 at the fore end of the engaging portion 6012 of the securing element 601 that is in alignment with the mold cavity 621;

f.) Starting a first stroke of the punch apparatus to let the first punch rod 662 of the first cylinder assembly extent out so that the movable plate 65 is moved downward. When the second snap element 52 contacts with the film 530 and the first snap element 51, the punch head 681 is still moved downward so that the film 530 is extended into the cavity 621, as shown in FIG. 9. At this time, the film 530 is deformed with extension so that a first wall section 532 having pleats is formed. When the lower surface 682 is pressed on the securing element 601, the second snap element 52 is engaged with the first snap element 51 and the film 530 is sandwiched between these snap elements, as shown in FIG. 10;

g.) Starting a second stroke of the punch apparatus to let the second punch rod 672 of the second cylinder assembly extend out and punch the closed end of the sheath 53 so that the film 530 is plastically deformed and is formed with a second wall section 533 and a window in the form of a flat closed end, as shown in FIG. 11;

h.) Reversing the second stroke of the punch apparatus so that the second punch rod 672 of the second cylinder assembly is moved back; and i.) Reversing the first stroke of the punch apparatus so that the first punch rod 662 of the first cylinder assembly is moved back. At this stage, the ejection element 602 is collided with the ejection rod 603 and the product 5 is ejected from the securing element 601, as shown in FIG. 12.

Although a preferred embodiment of the invention has been illustrated and described, it will be obvious to those skilled in the art that various modifications may be made without departing from the scope and spirit of the invention defined by the appended claims. For example, the base and the sheath can be bound together by supersonic welding.

What is claimed is:

1. A probe cover of a tympanic thermometer having a probe that has a front end, the probe cover comprising:

a base in the form of a ring-type plastic sheet formed with a central opening; and a film sheath portion that is infrared transparent and has an open end and a closed end, wherein the open end is attached to said base, the film sheath portion extending from the central opening can be fitted on the probe of the tympanic thermometer, said film sheath portion comprises a first wall section, a second wall section, and a window between the open end and the closed end, wherein the entire first wall section is formed with a plurality of pleat surfaces and the width of each pleat surface is gradually reduced in the direction from the open end to the closed end, the second wall section is formed with a smooth wall surface, and the window is in the form of a flat closed surface for fitting on the front end of the probe.

2. The probe cover of claim 1, wherein said pleats and said smooth wail surface are formed on a plastic film sheath sheet.

* * * * *